United States Patent
Struhsaker (10) Patent No.: US 6,859,655 B2
(45) Date of Patent: Feb. 22, 2005

(54) TDD FDD AIR INTERFACE

(75) Inventor: Paul F. Struhsaker, Plano, TX (US)

(73) Assignee: Raze Technologies, Inc., Plano, TX (US)

( * ) Notice: Subject to any disclaimer, the term of this patent is extended or adjusted under 35 U.S.C. 154(b) by 599 days.

(21) Appl. No.: 09/839,075

(22) Filed: Apr. 20, 2001

(65) Prior Publication Data

US 2002/0098821 A1 Jul. 25, 2002

Related U.S. Application Data

(60) Provisional application No. 60/262,955, filed on Jan. 19, 2001.

(51) Int. Cl.$^7$ ................................................. H04B 1/56
(52) U.S. Cl. ...................... 455/450; 455/447; 455/63.1; 455/67.11; 455/67.13; 455/446; 455/422.1; 370/321; 370/337; 370/347; 370/319; 370/442
(58) Field of Search ............................. 455/422.1, 450, 455/452.1, 447, 453, 63.1, 67.11, 67.13, 446; 370/321, 337, 347, 319, 344, 442

(56) References Cited

U.S. PATENT DOCUMENTS

| | | | |
|---|---|---|---|
| 5,625,623 A | * 4/1997 | Kent et al. .................. | 370/280 |
| 5,638,371 A | 6/1997 | Raychaudhuri et al. ..... | 370/347 |
| 5,684,791 A | 11/1997 | Raychaudhuri et al. ..... | 370/278 |
| 5,694,424 A | 12/1997 | Ariyavisitakul ............. | 375/233 |
| 5,732,076 A | * 3/1998 | Ketseoglou et al. ........ | 370/347 |
| 5,809,086 A | 9/1998 | Ariyavisitakul ............. | 375/332 |
| 5,991,292 A | 11/1999 | Focsaneanu et al. ........ | 370/352 |
| 5,999,818 A | 12/1999 | Gilbert et al. ............... | 455/448 |
| 6,188,873 B1 | 2/2001 | Wickman et al. ........... | 455/11.1 |
| 6,208,871 B1 | * 3/2001 | Hall et al. ................... | 455/517 |
| 6,226,274 B1 | * 5/2001 | Reese et al. ................. | 370/280 |
| 6,587,444 B1 | * 7/2003 | Lenzo et al. ................. | 370/330 |
| 6,611,507 B1 | * 8/2003 | Hottinen et al. ............. | 370/331 |
| 2002/0058513 A1 | * 5/2002 | Klein et al. .................. | 455/447 |

FOREIGN PATENT DOCUMENTS

| | | |
|---|---|---|
| EP | 0 444 841 A2 | 9/1991 |
| WO | WO 99/26437 | 5/1999 |

* cited by examiner

*Primary Examiner*—Edward F. Urban
*Assistant Examiner*—Huy Phan (57) ABSTRACT

Downlink and uplink frequencies in a wireless access system are time-shared by adjacent sectors, but remain dedicated to downlink or uplink transmission and may utilize FDD-only bandwidth within the MMDS spectrum. TDD wireless access equipment need only be modified by introducing a frequency change at the normal TDD guard point, with respective downlink or uplink periods for adjacent sectors offset to form overlapping frames. Cyclo-stationary processing, block equalization, and burst timing coordination allow the boundary between downlink and uplink portions of both frames to be set dynamically, improving spectral efficiency. Fast frequency switching within an allotted physical slot enables synchronization of time-sharing the dedicated frequencies to be maintained among sectors and cells. Duplex spacing between downlink and uplink frequencies for a given sector and adjacent sectors, combined with in-depth filtering of received signals, prevents spurious out-of-band transmission signal strength from reaching an interference level.

14 Claims, 8 Drawing Sheets

TDD FDD AIR INTERFACE

The present invention claims priority to U.S. Provisional Application Ser. No. 60/262,955 filed Jan. 19, 2001.

CROSS-REFERENCE TO RELATED APPLICATIONS

The present invention is related to those disclosed in the following U.S. Provisional and Non-Provisional Patent Applications:

1) Ser. No. 09/713,684, filed on Nov. 15, 2000, entitled "SUBSCRIBER INTEGRATED ACCESS DEVICE FOR USE IN WIRELESS AND WIRELINE ACCESS SYSTEMS";
2) Ser. No. 09/838,810, filed Apr. 20, 2001, entitled "WIRELESS COMMUNICATION SYSTEM USING BLOCK FILTERING AND FAST EQUALIZATION-DEMODULATION AND METHOD OF OPERATION";
3) Ser. No. 09/839,726, filed Apr. 20, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
4) Ser. No. 09/839,729, filed Apr. 20, 2001, entitled "APPARATUS AND METHOD FOR OPERATING A SUBSCRIBER INTERFACE IN A FIXED WIRELESS SYSTEM";
5) Ser. No. 09/839,719, filed Apr. 20, 2001, entitled "APPARATUS AND METHOD FOR CREATING SIGNAL AND PROFILES AT A RECEIVING STATION";
6) Ser. No. 09/838,910, filed Apr. 20, 2001, entitled "SYSTEM AND METHOD FOR INTERFACE BETWEEN A SUBSCRIBER MODEM AND SUBSCRIBER PREMISES INTERFACES";
7) Ser. No. 09/839,509, filed Apr. 20, 2001, entitled "BACKPLANE ARCHITECTURE FOR USE IN WIRELESS AND WIRELINE ACCESS SYSTEMS";
Ser. No. 09/839,514, filed Apr. 20, 2001, entitled "SYSTEM AND METHOD FOR ON-LINE INSERTION OF LINE REPLACEABLE UNITS IN WIRELESS AND WIRELINE ACCESS SYSTEMS";
9) Ser. No. 09/839,512, filed Apr. 20, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
10) Ser. No. 09/839,259, filed Apr. 20, 2001, entitled "REDUNDANT TELECOMMUNICATION SYSTEM USING MEMORY EQUALIZATION APPARATUS AND METHOD OF OPERATION";
11) Ser. No.09/839,457, filed Apr. 20, 2001, entitled "WIRELESS ACCESS SYSTEM FOR ALLOCATING AND SYNCHRONIZING UPLINK AND DOWNLINK OF TDD FRAMES AND METHOD OF OPERATION";
12) Ser. No. 09/839,499, filed Apr. 20, 2001, entitled "APPARATUS, AND AN ASSOCIATED METHOD, FOR PROVIDING WLAN SERVICE IN A FIXED WIRELESS ACCESS COMMUNICATION SYSTEM";
13) Ser. No. 09/839,458, filed Apr. 20, 2001, entitled "WIRELESS ACCESS SYSTEM USING MULTIPLE MODULATION";
14) Ser. No.09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
15) Ser. No. 09/838,924, filed Apr. 20, 2001, entitled "APPARATUS FOR ESTABLISHING A PRIORITY CALL IN A FIXED WIRELESS ACCESS COMMUNICATION SYSTEM";
16) Ser. No. 09/839,727, filed Apr. 20, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM";
17) Ser. No. 09/839,734, filed Apr. 20, 2001, entitled "METHOD FOR ESTABLISHING A PRIORITY CALL IN A FIXED WIRELESS ACCESS COMMUNICATION SYSTEM";
18) Ser. No. 09/839,513, filed Apr. 20, 2001, entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS";
19) Ser. No. 60/262,712, filed on Jan. 19, 2001, entitled "WIRELESS COMMUNICATION SYSTEM USING BLOCK FILTERING AND FAST EQUALIZATION-DEMODULATION AND METHOD OF OPERATION";
20) Ser. No. 60/262,825, filed on Jan. 19, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
21) Ser. No.60/262,698, filed on Jan. 19, 2001, entitled "APPARATUS AND METHOD FOR OPERATING A SUBSCRIBER INTERFACE IN A FIXED WIRELESS SYSTEM";
22) Ser. No. 60/262,827, filed on Jan. 19, 2001, entitled "APPARATUS AND METHOD FOR CREATING SIGNAL AND PROFILES AT A RECEIVING STATION";
23) Ser. No. 60/262,826, filed on Jan. 19, 2001, entitled "SYSTEM AND METHOD FOR INTERFACE BETWEEN A SUBSCRIBER MODEM AND SUBSCRIBER PREMISES INTERFACES";
24) Ser. No. 60/262,951, filed on Jan. 19, 2001, entitled "BACKPLANE ARCHITECTURE FOR USE IN WIRELESS AND WIRELINE ACCESS SYSTEMS";
25) Ser. No. 60/262,824, filed on Jan. 19, 2001, entitled "SYSTEM AND METHOD FOR ON-LINE INSERTION OF LINE REPLACEABLE UNITS IN WIRELESS AND WIRELINE ACCESS SYSTEMS";
26) Ser. No. 60/263,101, filed on Jan. 19, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
27) Ser. No. 60/263,097, filed on Jan. 19, 2001, entitled "REDUNDANT TELECOMMUNICATION SYSTEM USING MEMORY EQUALIZATION APPARATUS AND METHOD OF OPERATION";
28) Ser. No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";
29) Ser. No. 60/262,708, filed on Jan. 19, 2001, entitled "APPARATUS, AND AN ASSOCIATED METHOD, FOR PROVIDING WLAN SERVICE IN A FIXED WIRELESS ACCESS COMMUNICATION SYSTEM";
30) Ser. No. 60/273,689, filed Mar. 5, 2001, entitled "WIRELESS ACCESS SYSTEM USING MULTIPLE MODULATION";
31) Ser. No. 60/273,757, filed Mar. 5,2001, entitled "WIRELESS ACCESS SYSTEM AND ASSOCIATED METHOD USING MULTIPLE MODULATION FOR-

MATS IN TDD FRAMES ACCORDING TO SUB-SCRIBER SERVICE TYPE";

32) Ser. No. 60/270,378, filed Feb. 21, 2001, entitled "APPARATUS FOR ESTABLISHING A PRIORITY CALL IN A FIXED WIRELESS ACCESS COMMUNICATION SYSTEM";

33) Ser. No. 60/270,385, filed Feb. 21, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM"; and 34) Ser. No. 60/270,430, filed Feb. 21, 2001, entitled "METHOD FOR ESTABLISHING A PRIORITY CALL IN A FIXED WIRELESS ACCESS COMMUNICATION SYSTEM";

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to communication network access systems and, more specifically, to for use in telecommunication equipment in, for example, a fixed wireless access system.

BACKGROUND OF THE INVENTION

Telecommunications access systems provide for voice, data, and multimedia transport and control between the central office (CO) of the telecommunications service provider and the subscriber (customer) premises. Prior to the mid-1970s, the subscriber was provided phone lines (e.g., voice frequency (VF) pairs) directly from the Class 5 switching equipment located in the central office of the telephone company. In the late 1970s, digital loop carrier (DLC) equipment was added to the telecommunications access architecture. The DLC equipment provided an analog phone interface, voice CODEC, digital data multiplexing, transmission interface, and control and alarm remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g., T1/T3 lines in North America, E1/E3 lines in Europe). ISDN was a logical extension of the digital network that had evolved throughout the 1980s. The rollout of ISDN in Europe was highly successful. However, the rollout in the United States was not successful, due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace.

To meet these demands, high speed DSL (digital subscriber line) modems and cable modems have been developed and introduced. The DLC architecture was extended to provide remote distributed deployment at the neighborhood cabinet level using DSL access multiplexer (DSLAM) equipment. The increased data rates provided to the subscriber resulted in upgrade DLC/DSLAM transmission interfaces from T1/E1 interfaces (1.5/2.0 Mbps) to high speed DS3 and OC3 interfaces. In a similar fashion, the entire telecommunications network backbone has undergone and is undergoing continuous upgrade to wideband optical transmission and switching equipment.

Similarly, wireless access systems have been developed and deployed to provide broadband access to both commercial and residential subscriber premises. Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) systems deployment from rural access to competitive local access in more urbanized areas. In addition, the age and inaccessibility of much of the older wired telephone infrastructure makes FWA systems a cost-effective alternative to installing new, wired infrastructure. Also, it is more economically feasible to install FWA systems in developing countries where the market penetration is limited (i.e., the number and density of users who can afford to pay for services is limited to small percentage of the population) and the rollout of wired infrastructure cannot be performed profitably. In either case, broad acceptance of FWA systems requires that the voice and data quality of FWA systems must meet or exceed the performance of wired infrastructure.

Wireless access systems must address a number of unique operational and technical issues including:

1) Relatively high bit error rates (BER) compared to wire line or optical systems; and 2) Transparent operation with network protocols and protocol time constraints for the following protocols:
   a) ATM;
   b) Class 5 switch interfaces (domestic GR-303 and international V5.2);
   c) TCP/IP with quality-of-service QoS for voice over IP (VOIP) (i.e., RTP) and other H.323 media services;
   d) Distribution of synchronization of network time out to the subscribers;

3) Increased use of voice, video and/or media compression and concentration of active traffic over the air interface to conserve bandwidth;

4) Switching and routing within the access system to distribute signals from the central office to multiple remote cell sites containing multiple cell sectors and one or more frequencies of operation per sector; and 5) Remote support and debugging of the subscriber equipment, including remote software upgrade and provisioning.

Unlike physical optical or wire systems that operate at bit error rates (BER) of $10^{31\ 11}$, wireless access systems have time varying channels that typically provide bit error rates of $10^{31\ 3}$ to $10^{31\ 6}$. The wireless physical (PHY) layer interface and the media access control (MAC) layer interface must provide modulation, error correction and ARQ protocol that can detect and, where required, correct or retransmit corrupted data so that the interfaces at the network and at the subscriber site operate at wire line bit error rates.

Wireless access systems, as well as other systems which employ a shared communications media, must also provide a mechanism for allocating available communications bandwidth among multiple transmitting and receiving groups. Many wireless systems employ either a time division duplex (TDD) time division multiple access (TDMA) or a frequency diversity duplex (FDD) frequency division multiple access (FDMA) allocation scheme illustrated by the timing diagram of FIGS. 3A and 3B. TDD 300 shares a single radio frequency (RF) channel F1 between the base and subscriber, allocating time slices between the downlink 301 (transmission from the base to the subscriber) and the uplink 302 (transmission from the subscriber to the base). FDD 310 employs two frequencies F1 and F2, each dedicated to either the downlink 311 or the uplink 312 and separated by a duplex spacing 313.

For wireless access systems which provide Internet access in addition to or in lieu of voice communications, data and other Web based applications dominate the traffic load and connections within the system. Data access is inherently asymmetric, exhibiting typical downlink-to-uplink ratios of between 4:1 and 14:1.

Figure 3A:
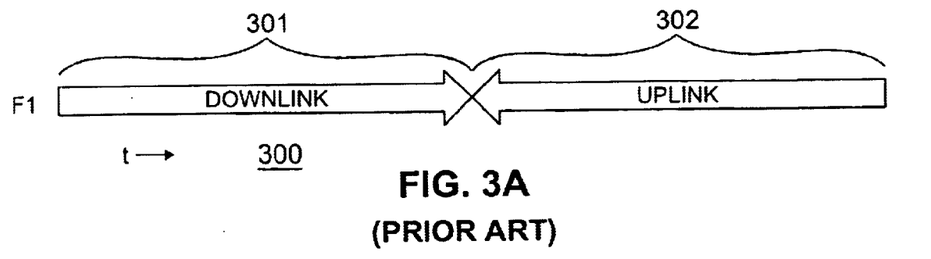
FIGS. 3A–3E are comparative high level timing diagrams illustrating the bandwidth allocation among sectors and cells according to the prior art and according to one embodiment of the present invention.
Figure 3B:
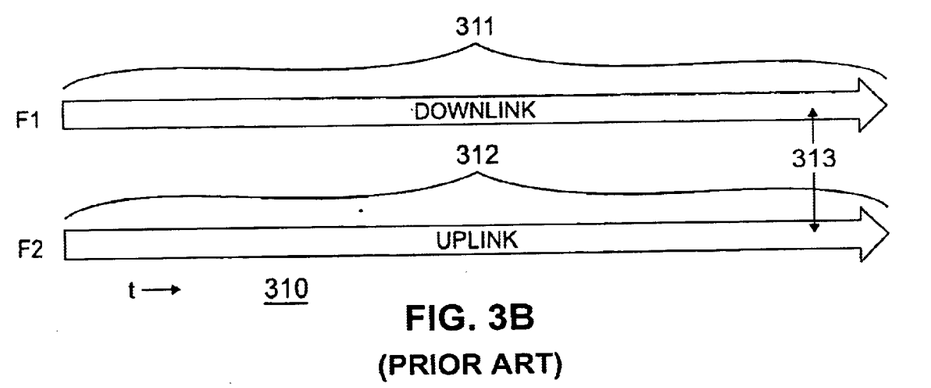

TDD systems, in which the guard point (the time at which changeover from the downlink 301 to the uplink 302 occurs) within a frame may be shifted to alter the bandwidth allocation between the downlink 301 and the uplink 302, have inherent advantages for data asymmetry and efficient use of spectrum in providing broadband wireless access. TDD systems exhibit 40% to 90% greater spectral efficiency for asymmetric data communications than FDD systems, and also support shifting of power and modulation complexity from the subscriber unit to the base to lower subscriber equipment costs.

Within the spectrum allocated to multichannel multipoint distribution systems (MMDS), however, some spectrum is regulated for only FDD operation. Since the total spectrum allocated to MMDS is relatively small (2.5–2.7 GHz, or about 30 6 MHz channels), some service providers may desire to utilize the FDD-only spectrum, preferably utilizing the TDD-based equipment employed in other portions of the MMDS spectrum.

There is, therefore, a need in the art for enabling TDD-based equipment to operate utilizing frequencies reserved for FDD only operation.

SUMMARY OF THE INVENTION

To address the above-discussed deficiencies of the prior art, it is a primary object of the present invention to provide, for use in a wireless access network, a bandwidth allocations scheme allowing TDD equipment to operate utilizing frequencies reserved for FDD-only operation with minimal.

Downlink and uplink frequencies in a wireless access system are time-shared by adjacent sectors, but remain dedicated to downlink or uplink transmission and may utilize FDD-only bandwidth within the MMDS spectrum. TDD wireless access equipment need only be modified by introducing a frequency change at the normal TDD guard point, with respective downlink or uplink periods for adjacent sectors offset to form overlapping frames. Cyclostationary processing, block equalization, and burst timing coordination allow the boundary between downlink and uplink portions of both frames to be set dynamically, improving spectral efficiency. Fast frequency switching within an allotted physical slot enables synchronization of time-sharing the dedicated frequencies to be maintained among sectors and cells. Duplex spacing between downlink and uplink frequencies for a given sector and adjacent sectors, combined with in-depth filtering of received signals, prevents spurious out-of-band transmission signal strength from reaching an interference level.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless access network.

Figure 1:
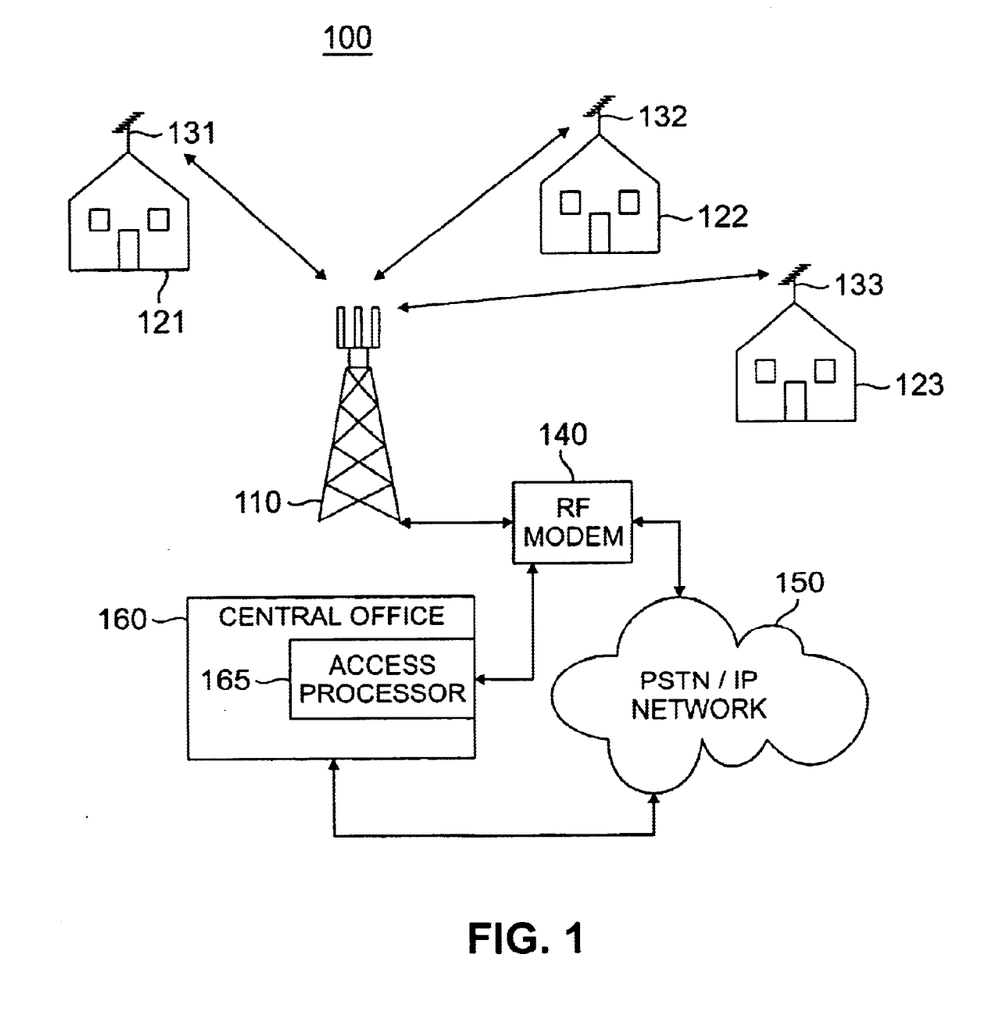
FIG. 1 illustrates exemplary fixed wireless access network 100 according to one embodiment of the present invention.

FIG. 1 illustrates an exemplary fixed wireless access network 100 according to one embodiment of the present invention. Fixed wireless network 100 comprises a plurality of transceiver base stations, including exemplary transceiver base station 110, that transmit forward channel (i.e., downstream) broadband signals to a plurality of subscriber premises, including exemplary subscriber premises 121, 122 and 123, and receive reverse channel (i.e., upstream) broadband signals from the plurality of subscriber premises. Subscriber premises 121–123 transmit and receive via fixed, externally-mounted antennas 131–133, respectively. Subscriber premises 121–123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel signals from external network 150 and transmit the reverse channel signals to external network 150. External network 150 may be, for example, the public switched telephone network (PSTN) or one or more data networks, including the Internet or proprietary Internet protocol (IP) wide area networks (WANs) and local area networks (LANs). Exemplary transceiver base station 110 is coupled to RF modem 140, which, among other things, up-converts baseband data traffic received from external network 150 to RF signals transmitted in the forward channel to subscriber premises 121–123. RF modem 140 also down-converts RF signals received in the reverse channel from subscriber premises 121–123 to baseband data traffic that is transmitted to external network 150. In an exemplary embodiment of the present invention in which external network 150 is the public switched telephone network (PSTN), RF modem 140 transmits baseband data traffic to, and receives baseband data traffic from, access processor 165, which is disposed in central office facility 160 of the PSTN.

It should be noted that network 100 was chosen as a fixed wireless network only for the purposes of simplicity and clarity in explaining a subscriber integrated access device according to the principles of the present invention. The choice of a fixed wireless network should not be construed in any manner that limits the scope of the present invention in any way. As will be explained below in greater detail, in alternate embodiments of the present invention, a subscriber integrated access device according to the principles of the present invention may be implemented in other types of broadband access systems, including wireline systems (i.e., digital subscriber line (DSL), cable modem, fiber optic, and the like) in which a wireline connected to the subscriber integrated access device carries forward and reverse channel signals.

Figure 2A:
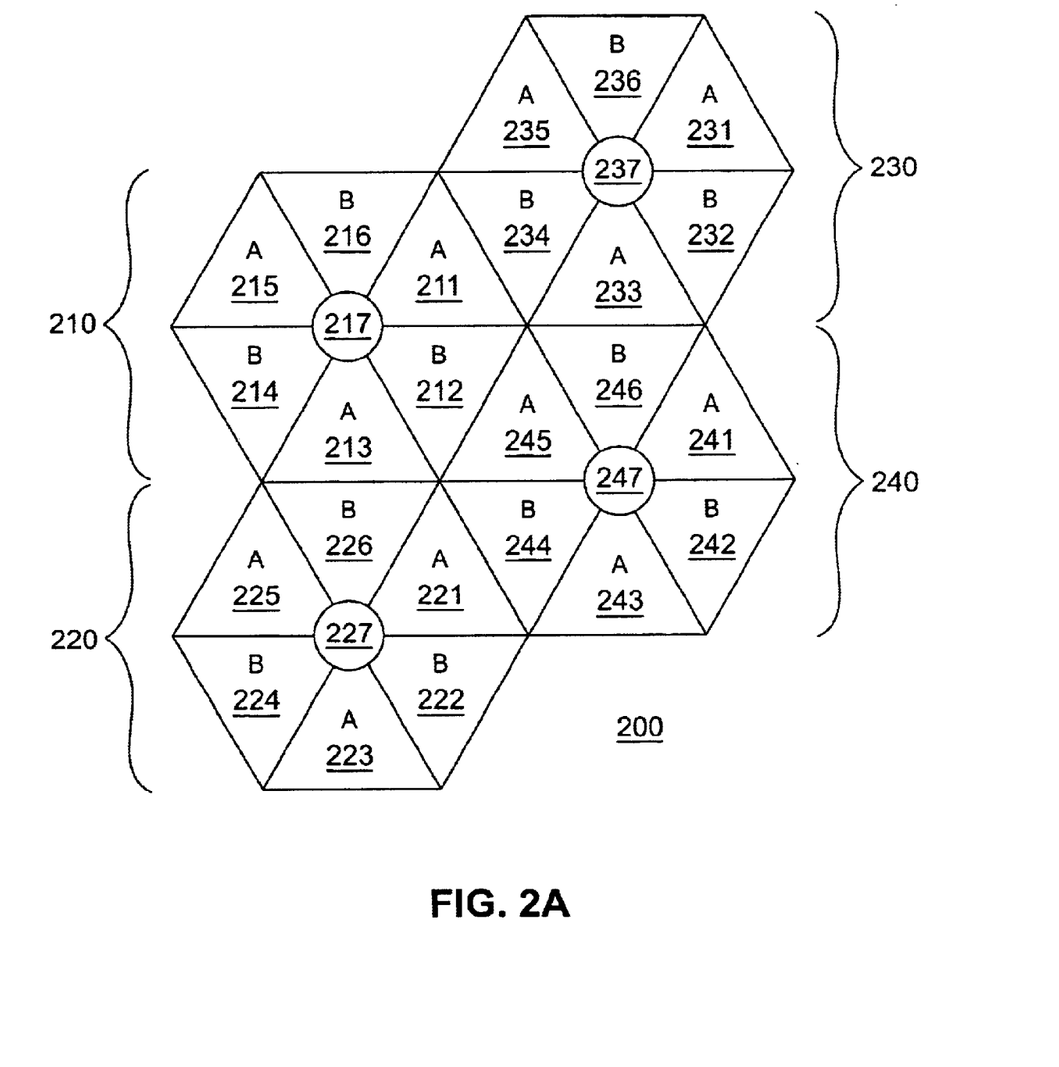
FIGS. 2A–2B depict cell and sector layouts for a wireless access coverage area according to various embodiments of the present invention.

FIG. 2A depicts a cell and sector layout for a wireless access coverage area according to one embodiment of the present invention. Coverage area 200 is logically divided into cells 210, 220, 230 and 240 each logically divided into a number of sectors 211–216, 221–226, 231–236 and 241–246, respectively. Each cell 210, 220, 230 and 240 includes a transceiver base station 110 as depicted in FIG. 1 at a central location 217, 227, 237, and 247, respectively, as well as subscriber premises 121–123 within the coverage area of the respective cell.

Sectors 211–216, 221–226, 231–236 and 241–246 are logically divided into two categories: those designated sector type "A" and those designated sector type "B", with sector categories alternating within a cell so that no two adjacent cells fall in the same category and with cells arranged so that no two adjacent sectors from adjoining cells fall in the same category. Each sector is falls within a different category than all other adjacent sectors with which the respective sector shares a common linear boundary.

Figure 3C:
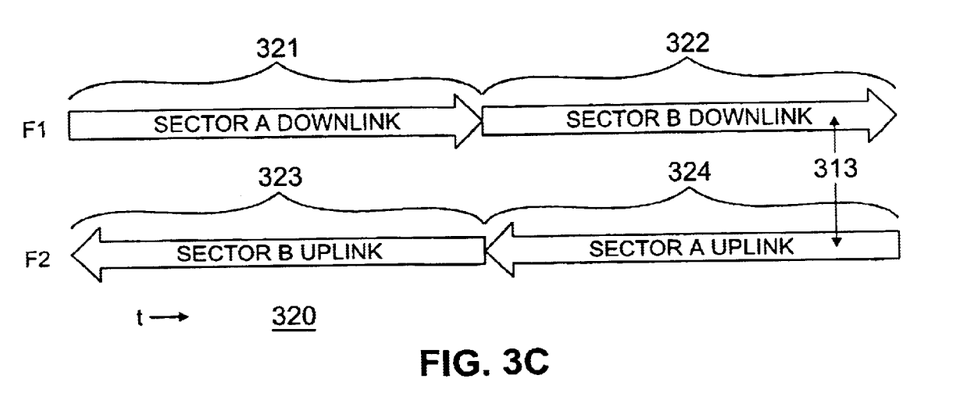
Figure 3D:
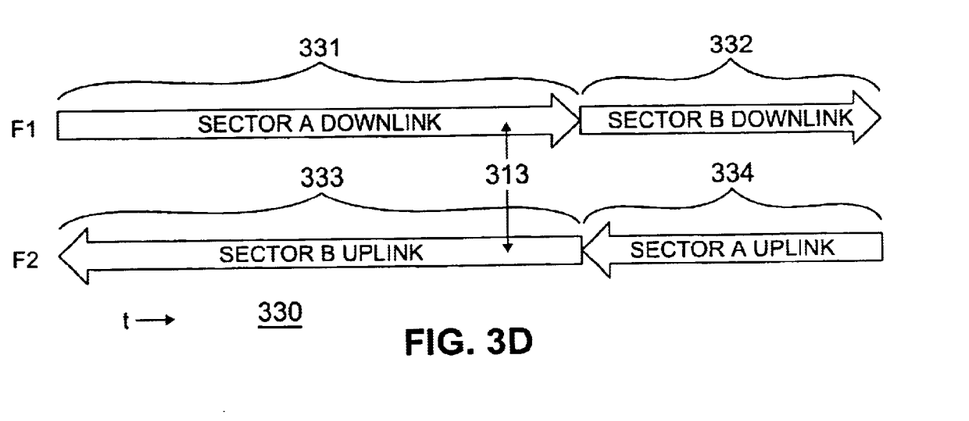
Figure 3E:
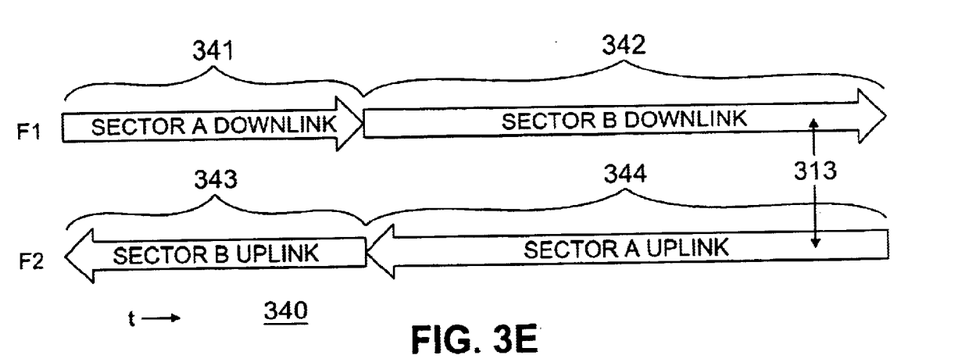

FIGS. 3C through 3E are high level timing diagrams illustrating bandwidth allocation among sectors according to one embodiment of the present invention, and are intended to be read in conjunction with FIG. 2A. The present invention incorporates FDD operation, with dedicated downlink and uplink channels, within a TDD system by introducing a frequency change at the normal TDD guard point. Transmission time on the dedicated downlink frequency F1 and the dedicated uplink frequency F2 are divided between adjacent sectors within categories A and B. Thus, the TDD FDD system 320 of the present invention allocates both a downlink period 321, 322 on the downlink frequency F1 and an uplink period 323, 324 on the uplink frequency F2 to each of the sectors within categories A and B.

The allocated periods 312/322 and 323/324 are offset in both time and frequency, then overlaid so that the sector A downlink period 321 does not coincide in time or frequency with the sector A uplink period 324 and the sector B downlink period 322 does not coincide in time or frequency with sector B uplink period 323. Instead, downlink transmission 321 in each sector within category A occurs at the same time as uplink transmission 323 within each sector within category B, while downlink transmission 322 in each sector within category B occurs concurrently with uplink transmission 324 for each sector within category A.

In this manner, the dedicated downlink frequency F1 and the dedicated uplink frequency F2 are time-shared by adjacent sectors, but remain dedicated to downlink or uplink transmission and may utilize FDD-only bandwidth within the MMDS spectrum. Duplex spacing 313 between downlink and uplink frequencies F1 and F2 (typically 50–70 MHz) is also maintained.

Figure 4:
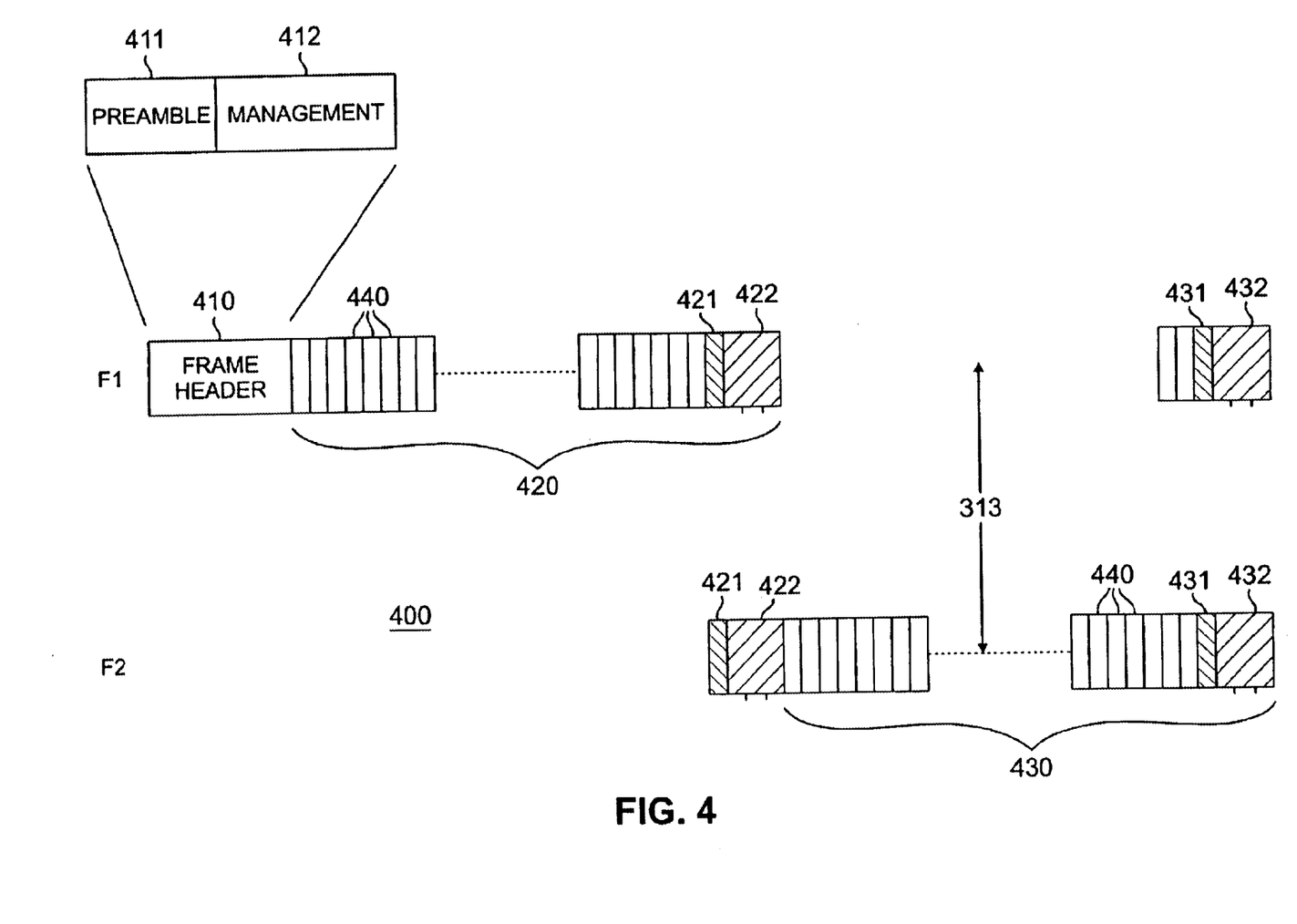
FIG. 4 depicts in greater detail a frame structure employed within the exemplary bandwidth allocation scheme according to one embodiment of the present invention.

FIG. 4 depicts in greater detail a frame structure employed within the exemplary bandwidth allocation scheme according to one embodiment of the present invention, and is intended to be read in conjunction with FIGS. 2 and 3C through 3E. The frame 400 depicted corresponds to each of the sectors within category A described above and depicted in FIGS. 2A and 3C through 3E, although each sector within category would utilize a similar frame, as described in further detail below.

Frame 400 includes a frame header 410, an downlink sub-frame 420, and an uplink sub-frame 430, with the downlink and uplink sub-frames logically divided into a number of physical slots 440. The frame header 410 includes a preamble 411 containing a start-of-frame field, which allows subscribers using fixed diversity to test reception conditions of the two diversity antennas, and a physical layer (the air interface is layered as a physical layer and a media access layer) media dependent convergence field, utilized to assist in synchronization and time/frequency recovery at the receiver. The preamble 411 is followed by media access management information 412, which includes a downlink MAP identifying the physical slot where the downlink ends and the uplink begins, an uplink MAP indicating uplink subscriber access grants and the associated physical slot start of the grant, and other management messages such as acknowledge (ACK) response, etc.

During the downlink sub-frame 420, the base transmitter and the subscriber receiver are both set to the downlink frequency F1. The downlink sub-frame 420 terminates with a frequency change physical slot 421, during which multi-stage digital filters within both the base and the subscriber unit are altered to switch to the uplink frequency F2, followed by a transmitter transition guard time 422, during which no transmission occurs to allow for propagation delays for all subscriber units. The transmitter transition guard time 422, depicted as occupying three physical slots in FIG. 4, is fully programmable both in position and duration, set by management physical layer attribute messages.

During the downlink sub-frame 430, the base receiver and the subscriber transmitter(s) are both set to the uplink frequency F2. The first physical slots within the uplink sub-frame 430 are subscriber registration or acquisition uplink ranging slots, utilized for both initial uplink synchronization of subscribers performing entry into the network and periodic update of synchronization of active subscribers, followed by contention slots, providing a demand access request mechanism to establish subscriber service for a single traffic service flow. When collisions occur within the contention slots, the subscriber employs a random back-off in integer frame periods and retries based on a time out for request of service. Contention slots use the lowest possible modulation, forward error correction (FEC), and orthogonal expansion supported by the base. The number and position of registration and contention slots within the uplink sub-frame 430 is set by the uplink MAP message within the media access management information portion 412 of the frame header 410.

The contention slots within the uplink sub-frame 430 are followed by individual subscriber transmissions which have been scheduled and allocated by the base in the uplink MAP, with each subscriber transmission burst performed at the maximum modulation, FEC and orthogonal expansion supported by the subscriber unit. The uplink sub-frame 430 terminates with a frequency change physical slot 431, during which both the base and the subscriber unit switch to the downlink frequency F1, followed by a receiver transition guard time 432, which is also programmable.

Frames for sectors falling within category B will have a similar structure, but will be offset so that the downlink sub-frame of each category B sector corresponds in time with the uplink sub-frame of each category A sector, and the uplink sub-frame of each category B sector corresponds in time with the downlink sub-frame of each category A sector. The boundary between downlink and uplink sub-frames is adaptive utilizing block equalization and burst timing coordination. Accordingly, uplink and downlink allocations to sectors in categories A and B may be divided equally as shown in FIG. 3C, or may be split to allow greater time within a particular frame to the downlink for sectors in category A, as shown in FIG. 3D, or to the downlink for sectors in category B, as shown in FIG. 3E. Spectral efficiency is therefore improved by adapting to the instantaneous traffic requirements among various sectors.

Figure 2B:
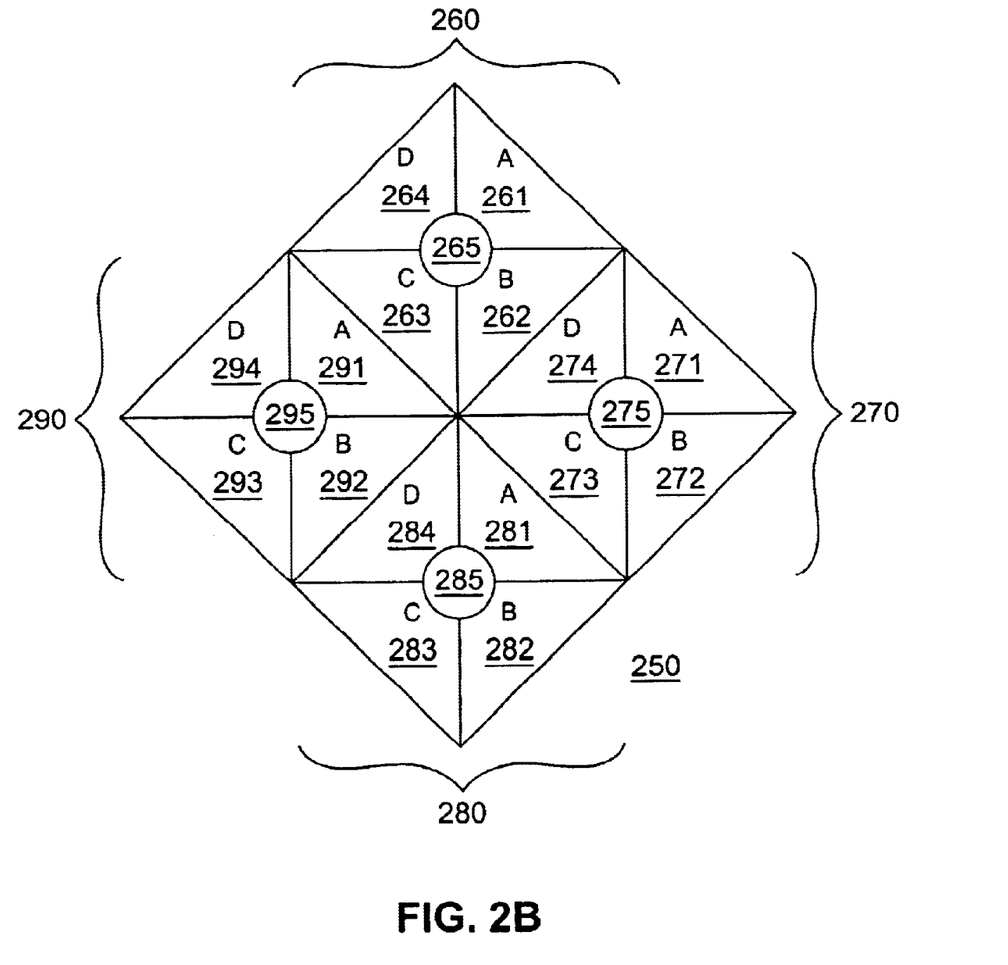

While the exemplary embodiment is described above with six sector cells and only two sector categories for the purposes of simplicity and clarity in describing the invention, the present invention may be extended to any number of sector categories equal to a power of 2 (e.g., 2, 4, 8, . . . , etc.), and preferably employs four sector categories. Where more than two sector categories are employed, downlink and uplink frequencies may be reused in pairs or in staggered offsets (e.g., each sector A shares a downlink frequency F1 with one adjacent sector B but shares an uplink frequency F2 with a different adjacent sector C, etc.). FIG. 2B depicts a cell and sector layout for a wireless access coverage area according to an alternative embodiment of the present invention. Coverage area 250 is logically divided into cells 260, 270, 280 and 290 each logically divided into four sectors 261–264, 271–274, 281–284 and 291–294, respectively. Each cell 260, 270, 280 and 290 includes a transceiver base station 110 as depicted in FIG. 1 at a central location 265, 275, 285, and 295, as well as subscriber premises 121–123 within the coverage area of the respective cell.

Sectors 261–264, 271–274, 281–284 and 291–294 in the alternative embodiment are logically divided into four categories, designated sector type "A", "B", "C" and "D", with sector categories arranged within a cell and between cells so that no two adjacent cells fall in the same category and no cell adjoins two or more cells in the same category. Each sector falls within a different category than all other adjacent sectors with which the respective sector shares a common linear boundary.

Figure 5:
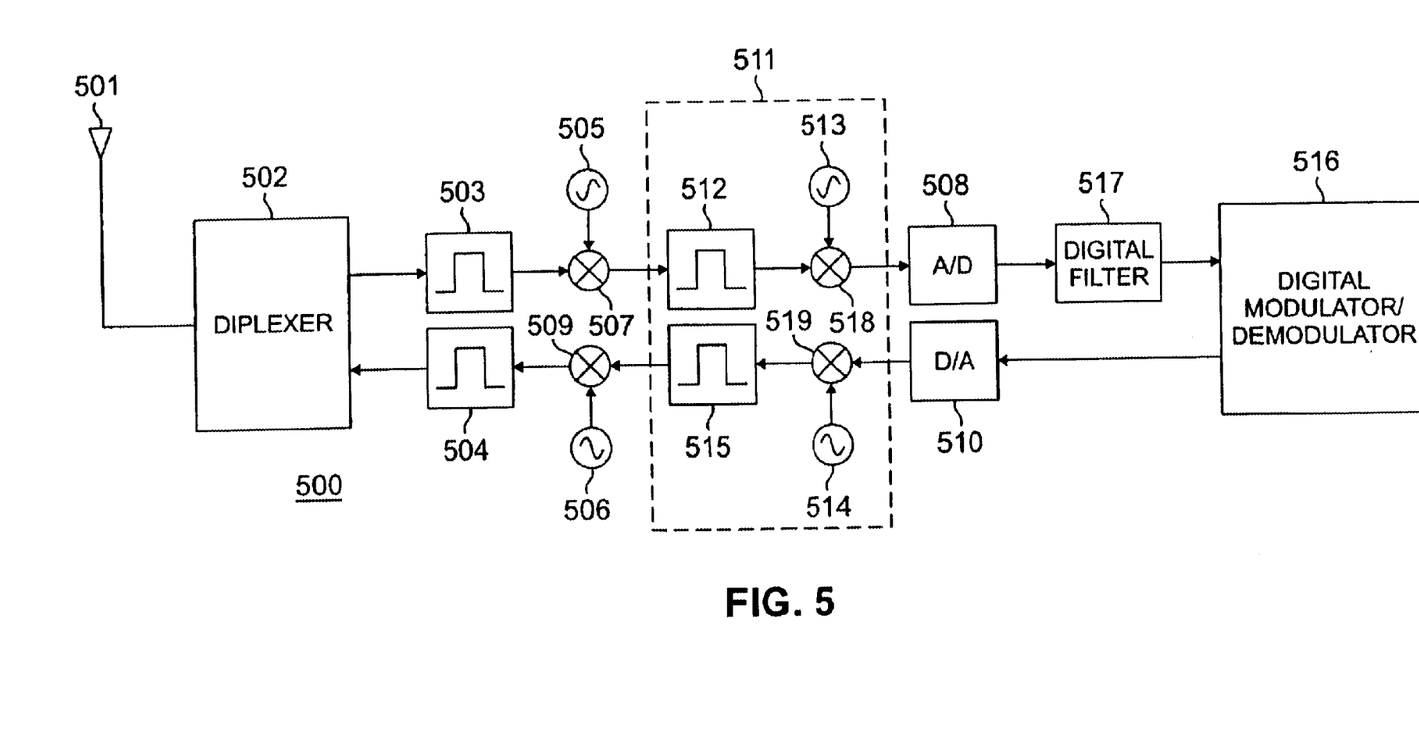
FIG. 5 is functional diagram of filtering employed for wireless communication within each cell and sector in accordance with one embodiment of the present invention.

FIG. 5 is functional diagram of filtering employed for wireless communication within each cell in accordance with one embodiment of the present invention, and is intended to be read in conjunction with FIGS. 1, 2A–2B, 3C–3E, and 4. The filtering system 500 depicted is implemented within each transceiver base station 110 and each subscriber access device on subscriber premises 121–123. The parameters for filtering system 500 implemented within each subscriber premises 121–123 will be described, although those skilled in the art will recognize that the filtering systems within each transceiver base station 110 will simply have the transmission and reception frequencies (i.e., downlink or uplink frequencies F1 and F2) reversed or otherwise changed.

Wireless signals at the appropriate downlink and uplink frequencies F1 and F2 for the subject cell and sector are transmitted and received via antenna 501 and separated by a diplexer 502. Signals received from or passed to diplexer 502 are filtered utilizing filters 503 and 504 tuned to downlink and uplink frequencies F1 and F2, respectively. The signal received from filter 503 is mixed with a signal from a local oscillator 505 tuned to the downlink frequency F1, while the signal transmitted to filter 504 is mixed with a signal from a local oscillator 506 tuned to the uplink frequency F2. If direct conversion is utilized, the output of mixer 507 may be connected directly to analog-to-digital (A/D) converter 508, and the input to mixer 509 may be connected directly to digital-to-analog (D/A) convert 510.

If super heterodyne conversion is employed, as is preferable, filtering system 500 includes a second (optional) conversion stage 511. Within conversion stage 511, the output of mixer 507 passes to a filter 512 tuned to an image frequency based on the downlink frequency F1, with the filtered output being mixed with a signal from a local oscillator 513 also tuned to the image frequency based on downlink frequency F1 before being passed to A/D converter 508. Similarly, signals from D/A converter 510 are mixed with a signal 20 from a local oscillator 514 tuned to an image frequency based on the uplink frequency F2 and is passed through a filter 515 also tuned to the image frequency based on the uplink frequency F2 before being passed to mixer 509.

A/D and D/A converters 508 and 510 are coupled to a digital modulator/demodulator 516 which decodes and generates the digital signals from the wireless communications downlinks and uplinks. Additional digital filtering 517 may optionally be employed between A/D converter 508 and modulator/demodulator 516. The filters 503, 504, 512 and 515, mixers 507, 509, 518 and 519, A/D/ and D/A converters 508 and 510, digital filter 517, and digital modulator/demodulator 516 may be implemented in either hardware or software, collectively, individually, or in any combination of the individual elements.

Filtering system 500 should have two essential characteristics for successful implementation of a TDD FDD system in accordance with the present invention. First, the frequency switching time between the uplink and downlink frequencies for the filtering system 500 within all transceivers (within each transceiver base station 110 and each subscriber premises 121–123) must be sufficiently fast to complete during the frequency change physical slots 421 and 431. Frequency change physical slots 421 and 431, together with guard times 422 and 432, insure that transmission of an uplink/downlink sub-frame is completed successfully before transmission of the next sub-frame is started. Frequency switching should preferably take no longer than ¼ to 1/10 the duration of physical slots 421 and 431. Physical slots 421 and 431 and/or guard times 422 and 432 may alternatively be extended in duration to accommodate longer frequency switching times within a transceiver between the downlink and uplink frequencies.

Figure 6:
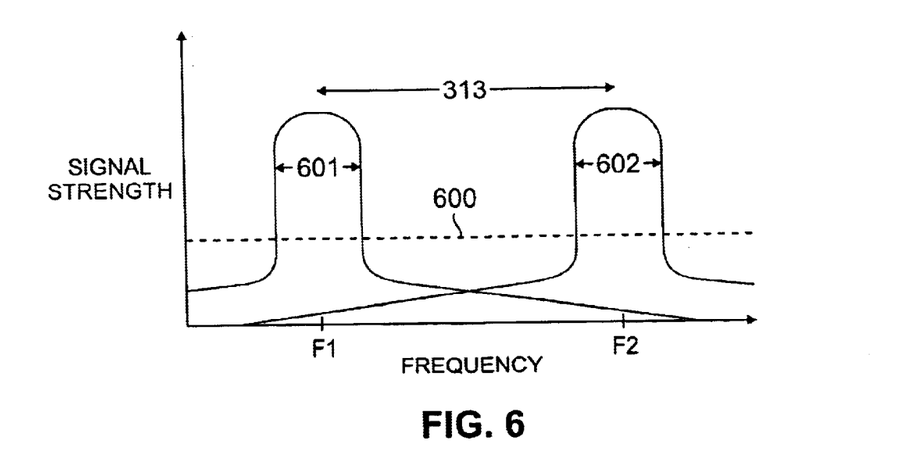
FIG. 6 illustrates a spectral response for filtering employed for wireless communication within each cell and sector in accordance with one embodiment of the present invention.

Second, filtering system 500 must filter transmitted and received signals in depth to ensure, in conjunction with the duplex spacing employed between the downlink and uplink frequencies F1 and F2, that spurious out-of-band transmission products do not interfere with the receiver. FIG. 6 illustrates a spectral response for filtering employed for wireless communication within each cell and sector in accordance with one embodiment of the present invention. A signal strength 600 at which unacceptable interference prevents successful communication may be identified or defined for a particular system. Filtering system 500 should pass signals within the band 601 allocated to downlink frequency F1 and within the band 602 allocated to uplink frequency F2. By virtue of duplex spacing 313 between the downlink and uplink frequencies F1 and F2, together with the in-depth filtering performed by filtering system 500, out-of-band signals are sufficiently rejected to prevent the signal strength from approaching interference level 600.

Figure 7:
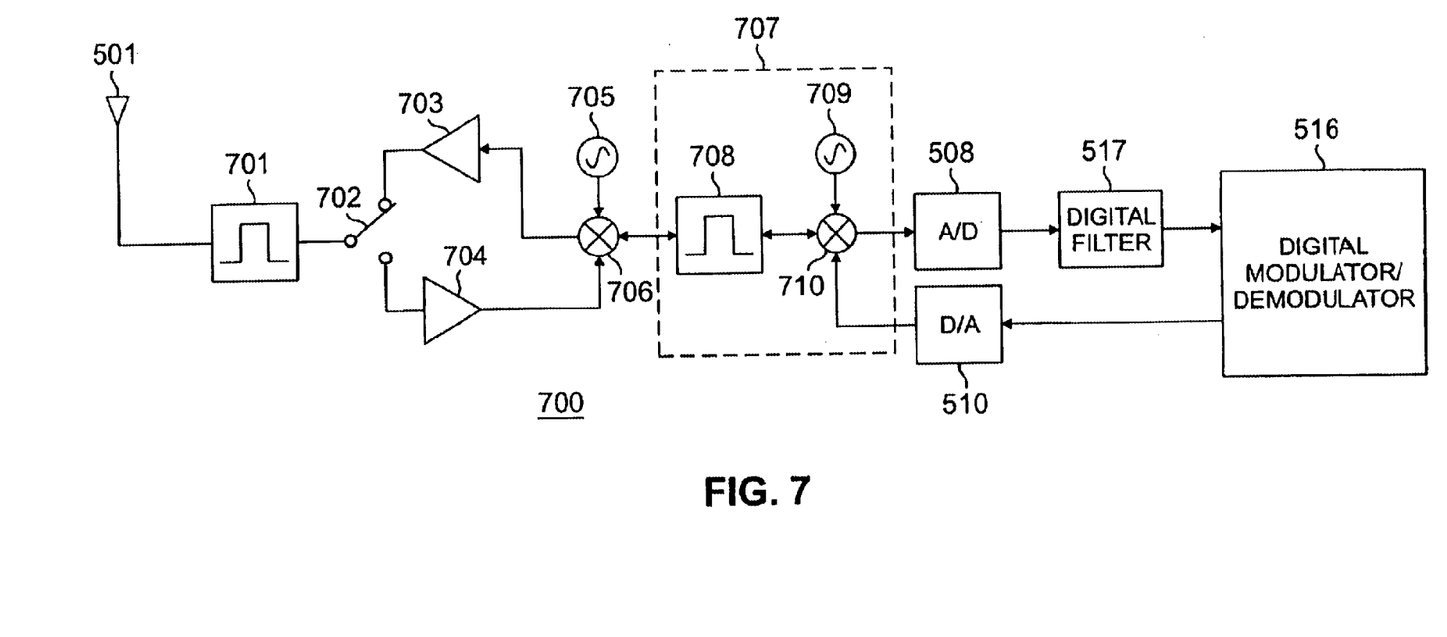
FIG. 7 is functional diagram of filtering employed for wireless communication within each cell and sector in accordance with another embodiment of the present invention.

FIG. 7 is functional diagram of filtering employed for wireless communication within each cell and sector in accordance with another embodiment of the present invention. Filtering system 700 receives wireless signals at the appropriate downlink and uplink frequencies F1 and F2 for the subject cell and sector via antenna 501. Signals received from or passed to antenna 501 are filtered utilizing filter 701, which covers the full FDD band employed for the subject sector. A switch 702 selective connects the filter 701 to a power amplifier (PA) 703 for transmission or to a low noise amplifier (LNA) 704 for reception.

In the embodiment depicted in FIG. 7, the conversion stages coupled to power amplifier 703 and low noise amplifier 704 are bidirectional, and as a result of the TDD aspect of the signal pattern employed may be reused for both transmitting and receiving signals. Local oscillator 705 coupled to mixer 706 should be capable of switching frequencies, converting signals at either the downlink frequency F1 or the uplink frequency F2 to an image frequency. Optional second stage 707 for superheterodyne conversion includes a filter 708 and local oscillator 709 both tuned to the image frequency and a mixer 710. A/D converter 508 and D/A converter 510 are both connected to mixer 710.

The FDD TDD strategy of the present invention permits filtering and conversion to be performed along a single, bi-directional signal path which is reused for both the downlink and the uplink, eliminating the need for separate paths and reducing the system costs. The spectral performance illustrated in FIG. 6 should be implemented by filtering system 700, with the frequency switching time for local oscillator 705 within the first conversion stage being critical to meeting the timing requirements imposed by the FDD TDD system of the present invention.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

Although the present invention has been described in detail, those skilled in the art should understand that they can make various changes, substitutions and alterations herein without departing from the spirit and scope of the invention in its broadest form.

What is claimed is:

1. For use in a wireless access network, a TDD FDD system comprising:

a first base station and a first subscriber unit within a first sector, the first base station transmitting to the first subscriber unit on a downlink frequency during a first time period and the first subscriber unit transmitting to the first base station on an uplink frequency during a second time period following the first time period; and a second base station and a second subscriber unit within a second sector adjacent to the first sector, the second base station transmitting to the second subscriberunit on the downlink frequency during the second time period and the second subscriber unit transmitting to the second base station on the uplink frequency during the first time period.

2. The system as set forth in claim 1, wherein the first base station is the second base station and the first and second sectors are adjacent sectors within a single cell.

3. The system as set forth in claim 1, wherein the first base station is separate from the second base station and the first and second sectors are adjacent sectors within adjoining cells.

4. The system as set forth in claim 1, wherein the downlink frequency and the uplink frequency are separated by a predefined duplex spacing, and wherein filtering of received signals at the downlink and uplink frequencies prevents out-of-band transmission signal strength from reaching an interference level.

5. A transceiver, comprising:
    means for transmitting or receiving on a first frequency designated for downlink transmission within a first sector during a first time period; and
    means for receiving or transmitting on a second frequency different from the first frequency and designated for uplink transmission within the first sector during a second time period following the first time period,
    wherein the first frequency is employed for downlink transmission during the second time period within a second sector adjacent to the first sector and the second frequency is employed for uplink transmission during the first time period within the second sector.

6. The transceiver as set forth in claim 5, wherein the means for transmitting or receiving on a first frequency designated for downlink transmission within a first sector during a first time period further comprises:
    a base station transmitting to a subscriber unit within the first sector.

7. The transceiver as set forth in claim 5, wherein the means for transmitting or receiving on a first frequency designated for downlink transmission within a first sector during a first time period further comprises:
    a subscriber unit within the first sector receiving from a base station.

8. The transceiver as set forth in claim 5, wherein the means for receiving or transmitting on a second frequency different from the first frequency and designated for uplink transmission within the first sector during a second time period following the first time period further comprises:
    a base station transmitting to a subscriber unit within the second sector.

9. The transceiver as set forth in claim 5, wherein the means for receiving or transmitting on a second frequency different from the first frequency and designated for uplink transmission within the first sector during a second time period following the first time period further comprises:
    a subscriber unit within the second sector receiving from a base station.

10. For use in a wireless access network, a method of time sharing frequencies reserved for FDD operation comprising the steps of:
    transmitting to a subscriber unit within a first sector during a first time period on a downlink frequency designated for downlink transmission;
    receiving from the subscriber unit within the first sector during a second time period following the first time period on an uplink frequency designated for uplink transmission;
    transmitting to a subscriber unit within a second sector adjacent to the first sector during the second time period on the downlink frequency; and
    receiving from the subscriber unit within the second sector during the first time period on the uplink frequency.

11. The method as set forth in claim 10, wherein the steps of transmitting to a subscriber unit within a first sector during a first time period on a downlink frequency designated for downlink transmission and transmitting to a subscriber unit within a second sector adjacent to the first sector during the second time period on the downlink frequency further comprise:
    transmitting from a single base station to adjacent sectors within a single cell.

12. The method as set forth in claim 10, wherein the steps of transmitting to a subscriber unit within a first sector during a first time period on a downlink frequency designated for downlink transmission and transmitting to a subscriber unit within a second sector adjacent to the first sector during the second time period on the downlink frequency further comprise:
    transmitting from different base stations to adjacent sectors within adjoining cells.

13. A signal pattern for time sharing frequencies reserved for FDD operation, comprising:
    downlink transmission to one or more subscribers within a first sector during a first time period on a downlink frequency designated for downlink transmission;
    downlink transmission to one or more subscribers within a second sector adjacent the first sector during a second time period following the first time period on the downlink frequency;
    uplink transmission from the one or more subscribers within the first sector during the second time period on an uplink frequency designated for uplink transmission; and
    uplink transmission from the one or more subscribers within the second sector during the first time period on the uplink frequency,
    wherein the downlink and uplink transmissions alternate between sectors in sequential time periods on dedicated frequencies.

14. The signal pattern of claim 13, wherein the downlink transmission occurs within the first sector on the downlink frequency concurrently with uplink transmission in each adjoining sector on the uplink frequency, and the uplink transmission occurs within the first sector on the uplink frequency concurrently with downlink transmission in each adjoining sector on the downlink frequency.

* * * * *